(12) United States Patent
Kim et al.

(10) Patent No.: US 11,139,539 B2
(45) Date of Patent: Oct. 5, 2021

(54) BATTERY MODULE HAVING BUS BAR ASSEMBLY

(71) Applicant: LG Chem, Ltd., Seoul (KR)

(72) Inventors: Kyung-Mo Kim, Daejeon (KR);
Jeong-O Mun, Daejeon (KR);
Jin-Yong Park, Daejeon (KR);
Jung-Hoon Lee, Daejeon (KR);
Ho-June Chi, Daejeon (KR)

(73) Assignee: LG Chem, Ltd.

( * ) Notice: Subject to any disclaimer, the term of this patent is extended or adjusted under 35 U.S.C. 154(b) by 147 days.

(21) Appl. No.: 16/620,982

(22) PCT Filed: Dec. 13, 2018

(86) PCT No.: PCT/KR2018/015879
§ 371 (c)(1),
(2) Date: Dec. 10, 2019

(87) PCT Pub. No.: WO2019/124876
PCT Pub. Date: Jun. 27, 2019

(65) Prior Publication Data
US 2020/0112014 A1    Apr. 9, 2020

(30) Foreign Application Priority Data

Dec. 19, 2017    (KR) .................. 10-2017-0175191

(51) Int. Cl.
*H01M 50/531* (2021.01)
*H01M 10/42* (2006.01)
(Continued)

(52) U.S. Cl.
CPC ....... *H01M 50/531* (2021.01); *H01M 10/425* (2013.01); *H01M 50/20* (2021.01);
(Continued)

(58) Field of Classification Search
None
See application file for complete search history.

(56) References Cited

U.S. PATENT DOCUMENTS

2008/0199765 A1    8/2008  Yoon et al.
2012/0301747 A1    11/2012 Han et al.
(Continued)

FOREIGN PATENT DOCUMENTS

JP    2009512982 A    3/2009
JP    2012079666 A    4/2012
(Continued)

OTHER PUBLICATIONS

Extended European Search Report including Written Opinion for Application No. EP188926802, dated Nov. 13, 2020, pp. 1-8.
(Continued)

*Primary Examiner* — Wyatt P McConnell
(74) *Attorney, Agent, or Firm* — Lerner, David, Littenberg, Krumholz & Mentlik, LLP

(57) ABSTRACT

Provided is a battery module in which heat generation of a current path of a module bus bar mounted on a bus bar assembly is reduced. The battery module includes: a cell assembly including a secondary batteries that each include electrode leads; and a bus bar assembly including: a module bus bar including an upper plate portion and a lower plate portion that electrically connect the secondary batteries and the module terminal and each have at least one region separated from each other, a connection extending portion that extends to one side end portion of each of the upper plate portion and the lower plate portion, and a bent connecting portion that is combined to the module terminal provided at a top of the upper plate portion; and a pressur-
(Continued)

izing bus bar pressurizing the electrode leads such that end portions of the electrode leads contact the lower plate portion.

19 Claims, 10 Drawing Sheets

(51) Int. Cl.
*H01M 50/20* (2021.01)
*H01M 50/543* (2021.01)
(52) U.S. Cl.
CPC .. *H01M 50/543* (2021.01); *H01M 2010/4271* (2013.01); *H01M 2220/20* (2013.01)

(56) References Cited

U.S. PATENT DOCUMENTS

| | | |
|---|---|---|
| 2013/0288530 A1 | 10/2013 | Zhao |
| 2013/0316200 A1 | 11/2013 | Ochi |
| 2016/0126531 A1 | 5/2016 | Kim et al. |
| 2016/0141712 A1 | 5/2016 | Choi et al. |
| 2016/0351867 A1 | 12/2016 | Tonomura et al. |
| 2017/0125770 A1 | 5/2017 | Kim et al. |
| 2017/0125774 A1 | 5/2017 | Choi et al. |
| 2017/0207023 A1 | 7/2017 | Kuboki et al. |
| 2018/0194235 A1 | 7/2018 | Kim et al. |
| 2018/0261387 A1 | 9/2018 | Kuboki et al. |
| 2019/0058183 A1 | 2/2019 | Lee et al. |
| 2020/0020915 A1 | 1/2020 | Chi et al. |
| 2020/0076025 A1 | 3/2020 | Jo et al. |
| 2020/0099034 A1 | 3/2020 | Jin et al. |

FOREIGN PATENT DOCUMENTS

| | | |
|---|---|---|
| JP | 2013206844 A | 10/2013 |
| JP | 2015507819 A | 3/2015 |
| JP | 2017073210 A | 4/2017 |
| JP | 6172397 B2 | 8/2017 |
| KR | 20110076808 A | 7/2011 |
| KR | 20150052755 A | 5/2015 |
| KR | 20150113827 A | 10/2015 |
| KR | 20150115252 A | 10/2015 |
| KR | 101621182 B1 | 5/2016 |
| KR | 20170050511 A | 5/2017 |
| KR | 20170052324 A | 5/2017 |
| KR | 20170056877 A | 5/2017 |
| KR | 20170093577 A | 8/2017 |
| KR | 20170103232 A | 9/2017 |
| WO | 2019074211 A1 | 4/2019 |
| WO | 2019088714 A1 | 5/2019 |
| WO | 2019107717 A1 | 6/2019 |

OTHER PUBLICATIONS

International Search Report for Application No. PCT/KR2018/015879 dated Mar. 18, 2019.

BATTERY MODULE HAVING BUS BAR ASSEMBLY

CROSS-REFERENCE TO RELATED APPLICATIONS

The present application is a national phase entry under 35 U.S.C. § 371 of International Application No. PCT/KR2018/015879, filed Dec. 13, 2018, published in Korean, which claims priority to Korean Patent Application No. 10-2017-0175191 filed on Dec. 19, 2017 in the Republic of Korea, the disclosures of which are incorporated herein by reference.

TECHNICAL FIELD

The present disclosure relates to a battery module including a bus bar assembly, and more particularly, to a battery module in which heat generation on a current path of a module bus bar mounted on a bus bar assembly is reduced.

BACKGROUND ART

Currently commercialized secondary batteries include nickel cadmium batteries, nickel hydrogen batteries, nickel zinc batteries, lithium secondary batteries, etc. and the lithium secondary batteries thereamong are receiving attention according advantages of free charging/discharging, a very low self-discharge rate, and high energy density since a memory effect is barely generated compared to nickel-based secondary batteries.

Such a lithium secondary battery mainly uses a lithium-based oxide and a carbon material respectively as a positive electrode active material and a negative electrode active material. The lithium secondary battery includes an electrode assembly, in which a positive electrode plate and a negative electrode plate on which the positive electrode active material and the negative electrode active material are respectively coated are arranged with a separator therebetween, and an exterior material, i.e., a battery pouch exterior material, sealing and accommodating the electrode assembly with an electrolyte solution together.

Generally, the lithium secondary battery may be classified into a can-type secondary battery, in which the electrode assembly is embedded in a metal can, and a pouch-type secondary battery, in which the electrode assembly is embedded in a pouch of an aluminum laminate sheet, according to a shape of the exterior material.

Recently, the secondary battery is widely used not only in a small-sized apparatus, such as a portable electronic device, but also in medium- and large-sized apparatuses, such as a vehicle or an energy storage apparatus. When the secondary battery is used in the medium- and large-sized apparatuses, a large number of secondary batteries are electrically connected to increase capacity and output. In particular, the pouch-type secondary battery is mostly used in such medium- and large-sized apparatuses due to easy stacking.

Also, in order for the secondary batteries to be electrically connected inside a battery module, electrode leads may be connected to each other and a connected portion may be welded to maintain such a connected state. Moreover, the battery module may have parallel and/or series electric connection between the secondary batteries, and in this case, one end portion of the electrode lead may contact and be fixed to a bus bar for electric connection between the secondary batteries, via welding or the like.

In many cases, the electric connection between the secondary batteries is configured by bonding the electrode lead to the bus bar. At this time, in order to electrically connect the secondary batteries in parallel, the electrode leads of the same polarity are connected and bonded together and in order to electrically connect the secondary batteries in series, the electrode leads of different polarities are connected and bonded together.

In the related art, a bus bar having a plate shape is used to electrically connect a plurality of secondary batteries of a battery module.

However, when a cross-sectional area of a current path of a terminal bus bar where a module terminal of the battery module is formed is narrow, the bus bar may be deformed or components connected to the bus bar may be damaged due to heating of the bus bar when a high current is applied in a high power environment of the battery module.

Also, increasing a thickness of a member or attaching a separate connecting member so as to increase the cross-sectional area of the current path of the bus bar is not appropriate because manufacturing costs are increased.

DISCLOSURE

Technical Problem

The present disclosure is designed to solve the problems of the related art, and therefore the present disclosure is directed to providing a battery module in which heat generation on a current path of a module bus bar mounted on a bus bar assembly is reduced.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module including: a cell assembly including a plurality of secondary batteries that each include a plurality of electrode leads and are stacked in at least one direction; a module terminal including a connection terminal configured to provide electric connection with an external device; and a bus bar assembly including: a module bus bar including an upper plate portion and a lower plate portion that electrically connect the plurality of secondary batteries and the module terminal and each have at least one region separated from each other, a connection extending portion that extends to one side end portion of each of the upper plate portion and the lower plate portion to electrically connect the upper plate portion and the lower plate portion to each other, and a bent connecting portion that protrudes from a top of the upper plate portion by being bent in an outward direction and has one region combined to the module terminal; and a pressurizing bus bar pressurizing the plurality of electrode leads such that end portions of the plurality of electrode leads contact the lower plate portion.

Also, the bus bar assembly may further include a bus bar frame having an outer surface where the module bus bar is mounted and having a penetrating hole through which at least one of the plurality of electrode leads penetrates and protrudes.

Moreover, end portions of at least some of the plurality of electrode leads may protrude from the plurality of secondary batteries to penetrate through the penetrating hole of the bus bar frame, and the lower plate portion may have a depressed structure recessed inward in a direction in which the plurality of electrode leads are contacted such as to accommodate and contact the end portions of the at least some of the plurality of electrode leads.

In addition, a lead contacting structure bending and protruding in an outward direction and contacting the at least some of the plurality of electrode leads may be formed at one region of the depressed structure.

Further, the bus bar frame may further include a spring configured to pressurize the pressurizing bus bar in a direction where the end portions of the at least some of the plurality of electrode leads are located.

Also, a plurality of partition walls protruding in an outward direction may be formed on the outer surface of the bus bar frame, and a fitting groove recessed inward such that an end portion of the connection extending portion is inserted thereinto may be formed at the partition wall.

Moreover, the bus bar frame may include a bus bar accommodating portion having an outer surface depressed in an inward direction to accommodate the module bus bar therein.

In addition, the bus bar accommodating portion may include: a hook structure protruding in an outward direction to fix the lower plate portion or the pressurizing bus bar; a detachment preventing structure protruding in an upward direction to prevent a bottom portion of the lower plate portion from being detached in an outward direction; and a guide structure configured to guide movement of the pressurizing bus bar in a pressurizing direction.

Further, the connection extending portion may extend obliquely in an inward direction from the upper plate portion and the lower plate portion.

In addition, the bus bar frame may include an auxiliary accommodating portion depressed in an inward direction to accommodate the connection extending portion.

In another aspect of the present disclosure, there is also provided a battery module including: a cell assembly including a plurality of secondary batteries that each include a plurality of electrode leads and are stacked in at least one direction; a module terminal including a connection terminal configured to provide electric connection with an external device; a bus bar assembly including: a module bus bar including: an upper plate portion and a lower plate portion that electrically connect the plurality of secondary batteries and the module terminal and each have at least one region separated from each other, a connection extending portion that electrically connects the upper plate portion and the lower plate portion to each other by being combined to at least one region of each of the upper plate portion and the lower plate portion, and a bent connecting portion that protrudes from a top of the upper plate portion by being bent in an outward direction and has one region combined to the module terminal; a pressurizing bus bar pressurizing the plurality of electrode leads such that end portions of the plurality of electrode leads contact the lower plate portion; and a bus bar frame having an outer surface where the module bus bar is mounted and having a penetrating hole through which at least one of the plurality of electrode leads penetrates and protrudes; an end plate combined to an outer surface of the bus bar assembly; and a plurality of side plates configured to surround side surfaces of the cell assembly.

In another aspect of the present disclosure, there is also provided a battery pack including at least one battery module.

In another aspect of the present disclosure, there is also provided a vehicle including the battery pack.

Advantageous Effects

According to an aspect of the present disclosure, in a battery module, since a connection extending portion provided in the module bus bar can extend an area of a current path of the module bus bar, deformation of a shape of a bus bar and damage to internal components of the battery module caused by high heat generated during operation of the battery module due to high electric resistance of the module bus bar may be prevented, and thus use stability may be increased.

In addition, according to such an aspect of the present disclosure, since a lead contacting structure of a lower plate portion has a bent protruding shape in an outward direction, the lead contacting structure may have a wide contact area with left and right surfaces of an electrode lead protruding in a front-and-back direction. Accordingly, it is possible to prevent high resistance from being generated at a contact connecting portion between the electrode lead and the module bus bar, thereby increasing the life of the battery module and increasing stability.

Also, according to an aspect of the present disclosure, since laser welding may be performed while an end portion of an electrode lead is adhered to a surface of a module bus bar by a pressurizing bus bar provided at a bus bar assembly, a bonding process of high reliability may be performed.

Moreover, according to an aspect of the present disclosure, since a module bus bar and a pressurizing bus bar are stably fixed to the outside of a bus bar frame by a hook structure formed at the bus bar frame, efficiency of a welding process between an electrode lead and the module bus bar may be increased and durability of a finished product may be increased.

Also, according to an aspect of the present disclosure, since a detachment preventing structure formed at a bus bar frame of the present disclosure is configured to prevent a module bus bar from being detached to the outside, not only the module bus bar is stably fixed to the bus bar frame, but also frequent movement of the module bus bar is prevented, thereby effectively preventing a connecting structure between an electrode lead and the module bus bar from being damaged.

Moreover, according to another aspect of the present disclosure, in a module bus bar of the present disclosure, since a connection extending portion is inserted into a fitting groove formed at a partition wall of a bus bar frame to be firmly fixed and the fitting groove guides the module bus bar to be fixed at an accurate location, manufacturing time can be reduced.

In addition, according to another aspect of the present disclosure, since an end portion of an electrode lead is disposed between a module bus bar and a pressurizing bus bar to be bonded to both the module bus bar and the pressurizing bus bar, a bonding area between the module bus bar and the pressurizing bus bar can be effectively increased and reliability of electric connection can be increased.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
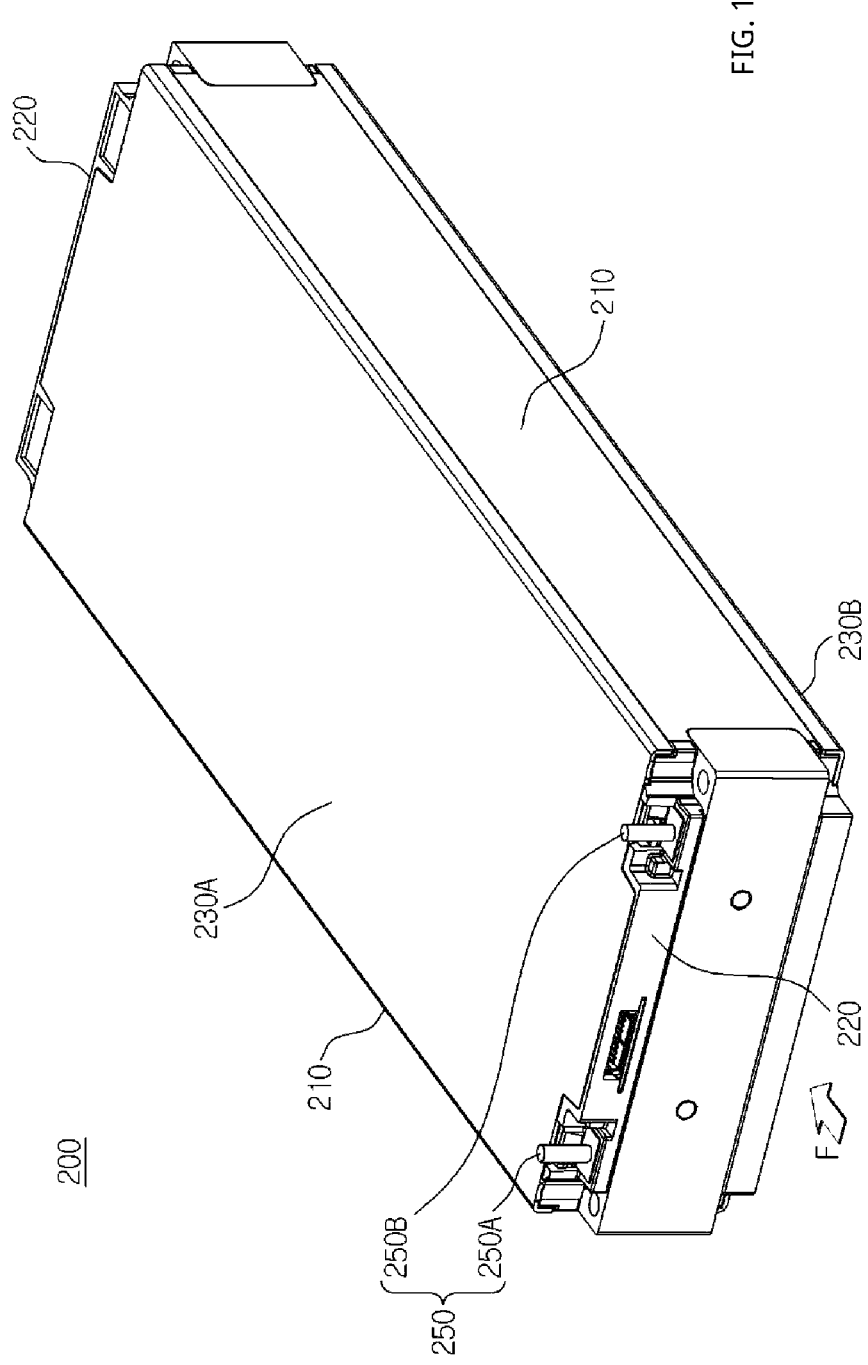
FIG. 1 is a perspective view schematically showing a battery module according to an embodiment of the present disclosure.
Figure 2:
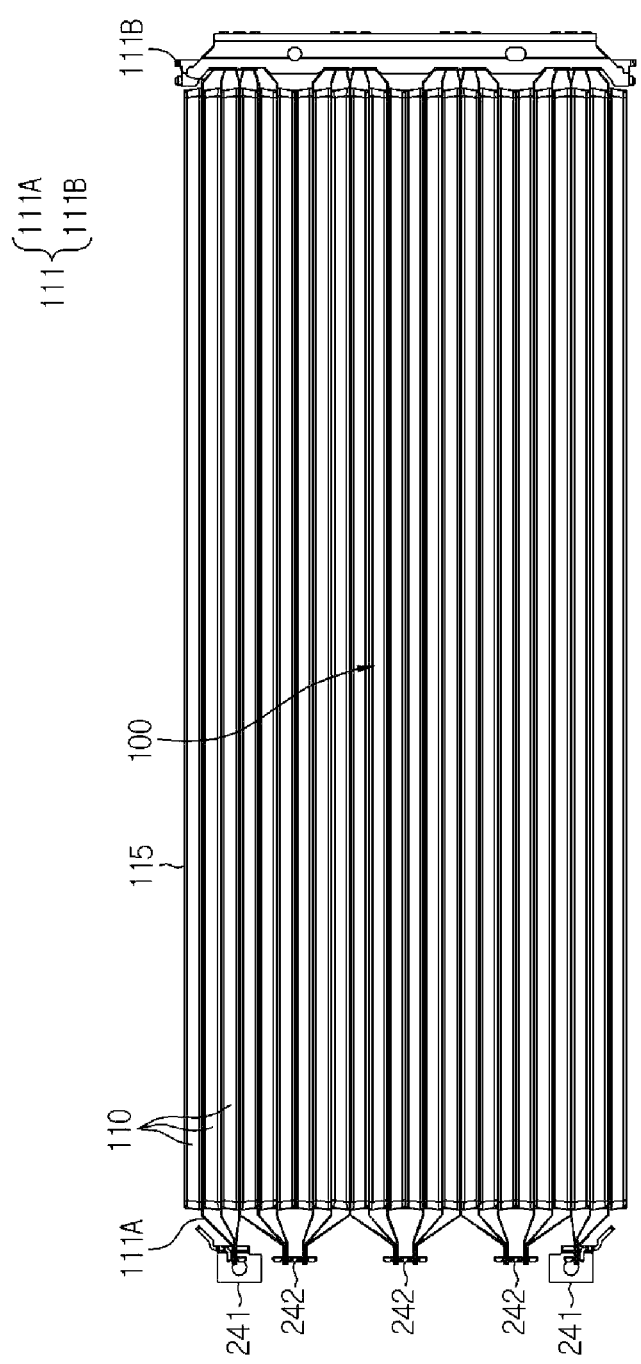
FIG. 2 is a plan view schematically showing some components of a battery module, according to an embodiment of the present disclosure.

FIG. 1 is a perspective view schematically showing a battery module according to an embodiment of the present disclosure. FIG. 2 is a plan view schematically showing some components of a battery module, according to an embodiment of the present disclosure. Also, FIG. 3 is a perspective view schematically showing some components of a battery module, according to an embodiment of the present disclosure.

Figure 3:
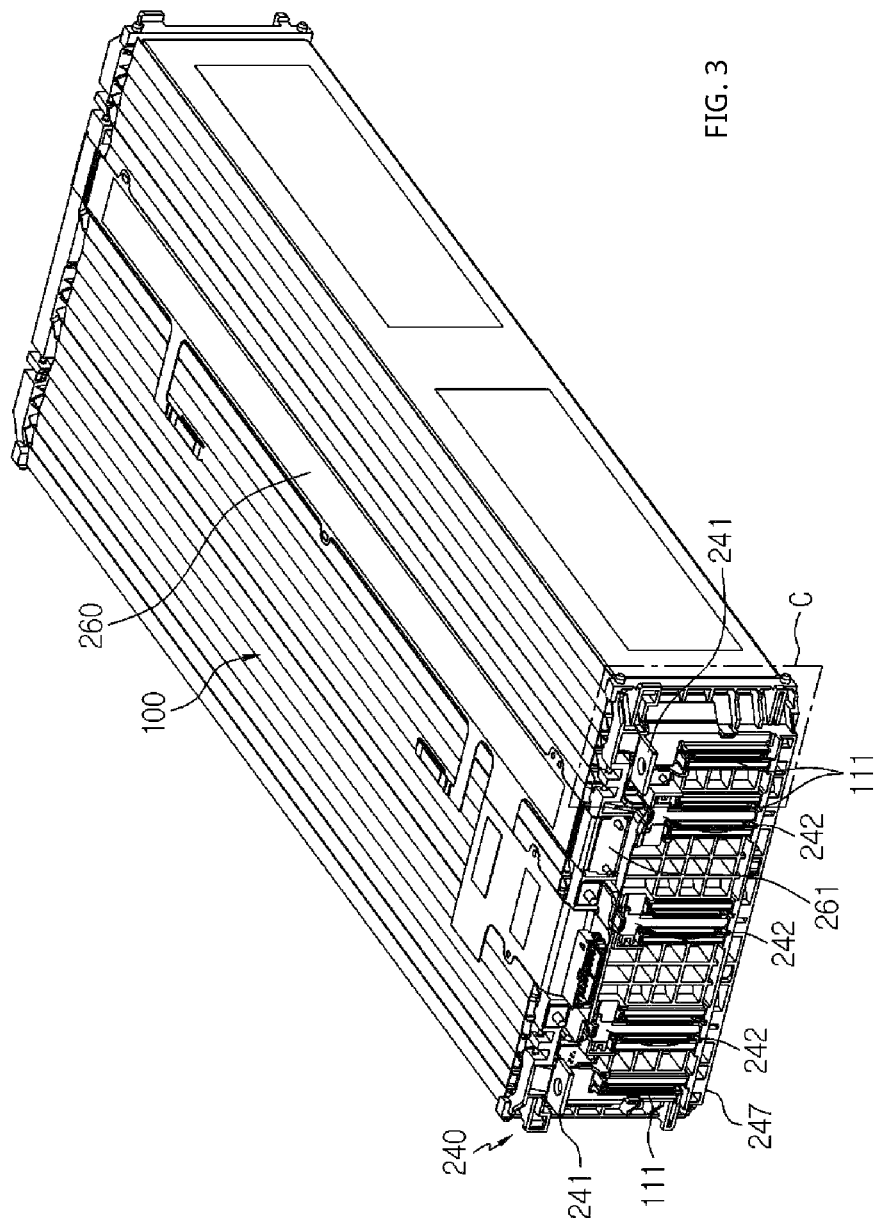
FIG. 3 is a perspective view schematically showing some components of a battery module, according to an embodiment of the present disclosure.

Referring to FIGS. 1 through 3, a battery module 200 according to an embodiment of the present disclosure includes a cell assembly 100, a module terminal 250, a bus bar assembly 240, an end plate 220, and a side plate 210.

Here, the cell assembly 100 may include a plurality of secondary batteries 110 stacked in at least one direction, and each of the plurality of secondary batteries 110 may include a plurality of electrode leads 111.

In detail, the secondary battery 110 may be a pouch-type secondary battery 110. In particular, such a pouch-type secondary battery 110 may include an electrode assembly (not shown), an electrolyte solution (not shown), and a pouch.

Here, the pouch may include an accommodating portion 115 having a concave shape. Also, the pouches may each include an external insulating layer, a metal layer, and an internal adhesive layer, and the internal adhesive layers may be adhered to each other at edge portions of the pouches such that a sealing portions are formed. Also, the accommodating portion 115 may seal and accommodate the electrode assembly and the electrolyte solution. In addition, in the secondary battery 110, the accommodating portion 115 may be erected to face both sides of the cell assembly 100 in a left-and-right direction.

Also, the electrode assembly is an assembly of an electrode and a separation film, and may be configured in a form in which at least one positive electrode plate and at least one negative electrode plate are arranged with the separation film therebetween. Also, a first electrode tab is provided at a first electrode plate of the electrode assembly, and at least one first electrode tab may be connected to a first electrode lead 111A. Here, the first electrode lead 111A may have one end connected to the first electrode tab and the other end exposed to the outside of the pouch, and such an exposed portion may function as an electrode terminal of the secondary battery 110, for example, a positive electrode terminal of the secondary battery 110.

In addition, a second electrode tab is provided at a second electrode plate of the electrode assembly, and at least one second electrode tab may be connected to a second electrode lead 111B. Also, the second electrode lead 111B may have one end connected to the second electrode tab and the other end exposed to the outside of the pouch, and such an exposed portion may function as an electrode terminal of the secondary battery 110, for example, a negative electrode terminal of the secondary battery 110.

Here, the first electrode tab and the second electrode tab included in the secondary battery 110 may be a positive electrode tab or a negative electrode tab, and the first electrode lead 111A and the second electrode lead 111B may be a positive electrode lead or a negative electrode lead. Moreover, the first electrode lead 111A and the second electrode lead 111B may be electrode leads 111 of different polarities. For example, the first electrode lead 111A may be a positive electrode lead and the second electrode lead 111B may be a negative electrode lead.

The positive electrode lead and the negative electrode lead may be provided on opposite directions based on the center of the secondary battery 110. For example, as shown in FIG. 2, each secondary battery 110 may be configured such that the first electrode lead 111A and the second electrode lead 111B protrude forward and backward.

As such, according to such a configuration of the present disclosure, in one secondary battery 110, an area of the electrode lead 111 may be increased by removing interference between the positive electrode lead and the negative electrode lead, and a welding process between the electrode leads 111 and a welding process between the electrode lead 111 and bus bars, i.e., a module bus bar 241 and a connection bus bar 242 may be further facilitated.

Also, the first electrode lead 111A and the second electrode lead 111B may be configured in a plate shape. In particular, the first electrode lead 111A and the second electrode lead 111B may each protrude in a front-and-back direction while a wide area is erected to face a left side and a right side.

Also, the plurality of secondary batteries 110 included in the battery module 200 may be arranged in one direction. For example, as shown in FIG. 2, the plurality of pouch-type secondary batteries 110 may be stacked in parallel in a horizontal direction. Here, when viewed from a direction indicated by an arrow F (shown in FIG. 1), each pouch-type secondary battery 110 may be arranged to be perpendicularly erected approximately on the ground such that two side surfaces are respectively positioned at the left and right sides and a sealing portion is positioned at top, bottom, front, and back portions.

In other words, the secondary battery 110 may be erected in an up-and-down direction such that the accommodating portion 115 is positioned at a side portion. Meanwhile, in the present specification, unless otherwise specified, up, down, front, back, left, and right directions are based on the direction indicated by the arrow F (shown in FIG. 1).

Since the configuration of the pouch-type secondary battery 110 described above is obvious to one of ordinary skill in the art, details thereof will not be provided here. Also, the battery module 200 according to the present disclosure may employ various secondary batteries well-known at the time of application of the present disclosure.

The module terminal 250 may include a connection terminal configured to provide electric connection with an external device. The connection terminal may be a terminal bolt. Also, the module terminal 250 may include a positive electrode module terminal 250A and a negative electrode module terminal 250B, as terminals provided in the battery module 200. In addition, the module terminal 250 may be exposed outside the end plate 220 to provide connection between the plurality of secondary batteries 110 of the battery module 200 and an external device (not shown).

The battery module 200 may further include a sensing circuit board 260 to perform voltage sensing or the like of the connection bus bar 242 electrically connected to the electrode lead 111.

Figure 4:
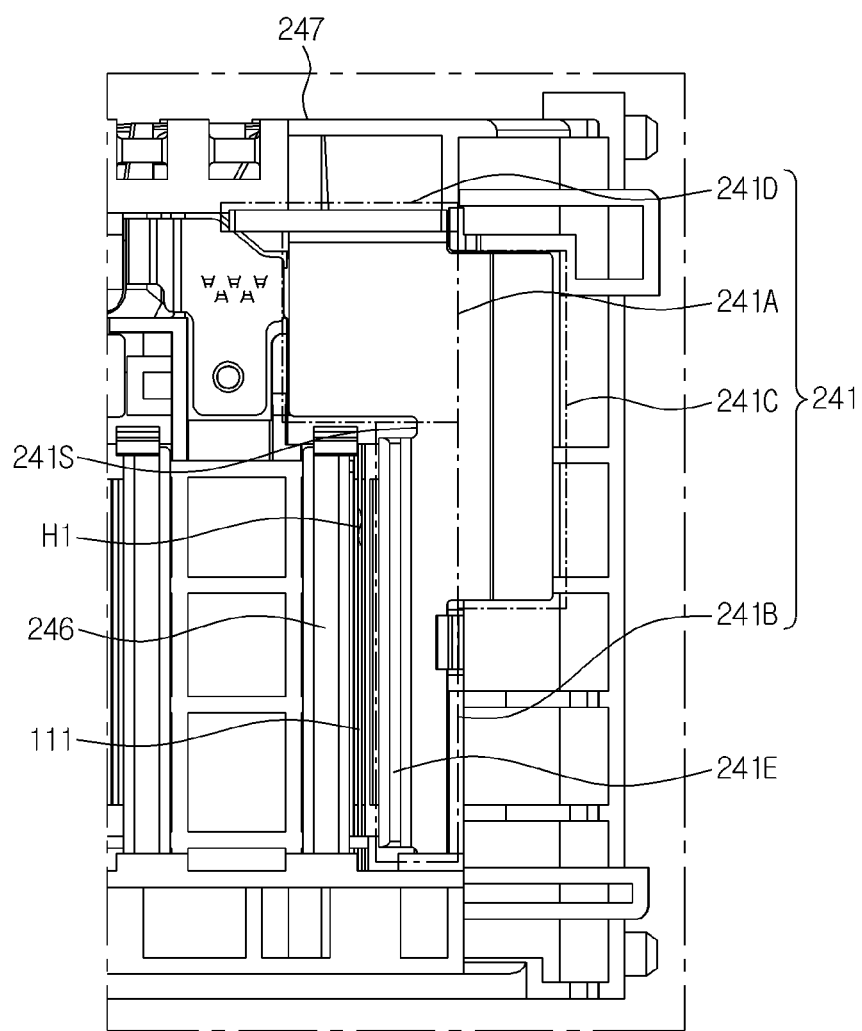
FIG. 4 is a partial front view schematically showing a region C' of the battery module of FIG. 3.
Figure 5:
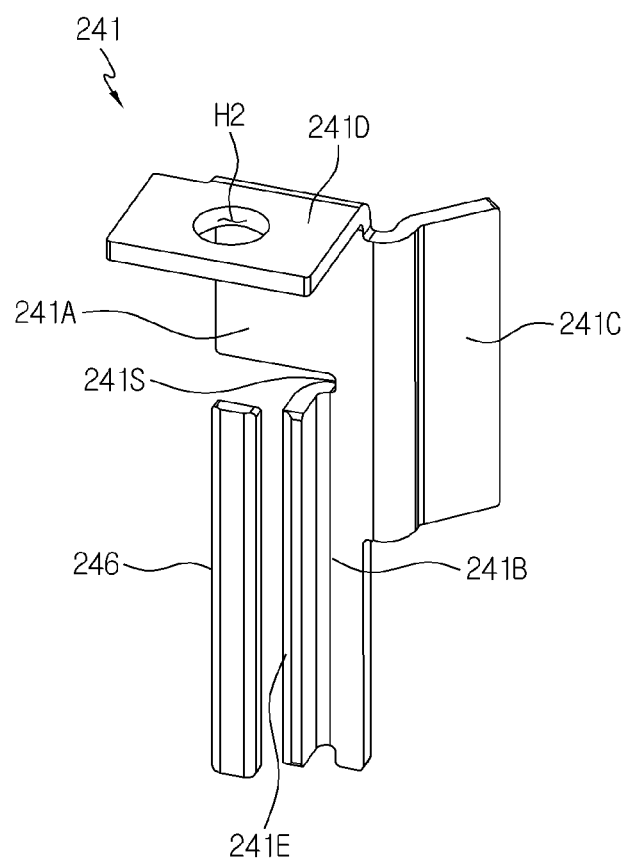
FIG. 5 is a perspective view schematically showing a module bus bar and a region of a pressurizing bus bar, which are some components of a battery module, according to an embodiment of the present disclosure.

FIG. 4 is a partial front view schematically showing a region C' of the battery module of FIG. 3. FIG. 5 is a perspective view schematically showing a module bus bar and a region of a pressurizing bus bar, which are some components of a battery module, according to an embodiment of the present disclosure. Also, FIG. 6 is a partial side view schematically showing some components of a battery module, according to an embodiment of the present disclosure.

Figure 6:
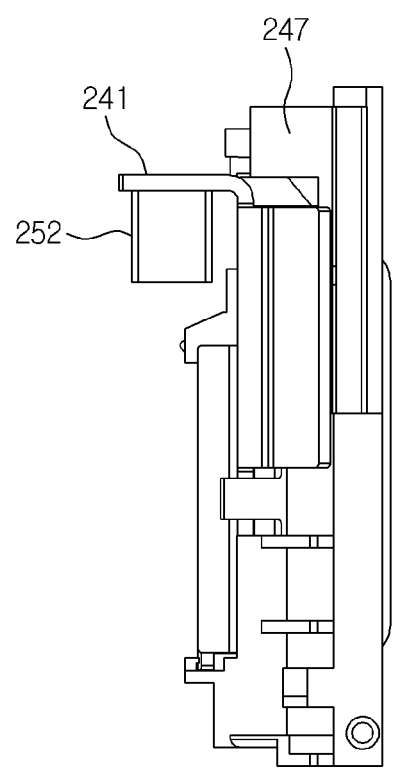
FIG. 6 is a partial side view schematically showing some components of a battery module, according to an embodiment of the present disclosure.

Referring to FIGS. 4 through 6, the bus bar assembly 240 may include the module bus bar 241 and a pressurizing bus bar 246.

Here, the module bus bar 241 may be configured to electrically connect the plurality of secondary batteries 110 and the module terminal 250. In other words, the module bus bar 241 may include an electric conductive metal material having relatively high electric conductivity. For example, the module bus bar 241 may include at least one electric conductive material selected from nickel, copper, aluminum, lead, or tin.

Since the module bus bar 241 needs to be welded to the electrode lead 111 or the module terminal 250, it is difficult to manufacture the module bus bar 241 via extrusion molding or casting that may generate air therein. Accordingly, the module bus bar 241 of the present disclosure may be manufactured via processing such as rolling punching, bending, or the like.

The module bus bar 241 may include an upper plate portion 241A, a lower plate portion 241B, a connection extending portion 241C electrically connecting the upper plate portion 241A and the lower plate portion 241B, and a bent connecting portion 241D formed at a top of the upper plate portion 241A.

In detail, the upper plate portion 241A may be provided above the lower plate portion 241B and at least a portion thereof may be separated from the lower plate portion 241B. In addition, the bent connecting portion 241D may be formed at a top portion of the upper plate portion 241A. Also, the lower plate portion 241B may directly contact and be connected to the electrode lead 111.

The connection extending portion 241C may extend to one side end portion of each of the upper plate portion 241A and the lower plate portion 241B such as to electrically connect the upper plate portion 241A and the lower plate portion 241B to each other.

Also, the connection extending portion 241C may have a protruding shape by extending in a left-and-right direction from one side of each of the upper plate portion 241A and the lower plate portion 241B. The protruding shape of the connection extending portion 241C may be, for example, a plate shape.

The bent connecting portion 241D may extend to bend and protrude in an outward direction from a top of the upper plate portion 241A. Also, at least one region of the bent connecting portion 241D may be combined to the module terminal 250.

The bent connecting portion 241D may include an insertion hole H2 into which a connection terminal of the module terminal 250 is inserted. In other words, when the connection terminal includes a terminal bolt and a nut, a round rod of the terminal bolt may be inserted into the insertion hole H2 of the bent connecting portion 241D and the round rod of the terminal bolt that penetrated through the insertion hole H2 may be additionally inserted and coupled to a penetrating hole of the nut located at a bottom portion of the bent connecting portion 241D. In addition, an insulating cover 252 may be coated on the nut to prevent a short-circuit with an external conductive material.

Meanwhile, the pressurizing bus bar 246 may include an electric conductive metal material having relatively high electric conductivity. For example, the pressurizing bus bar 246 may include at least one electric conductive material selected from nickel, copper, aluminum, lead, or tin.

The pressurizing bus bar 246 may be configured to pressurize the electrode lead 111 such that an end portion of the electrode lead 111 closely contact the lower plate portion 241B. In detail, the pressurizing bus bar 246 may have one side surface of a shape corresponding to left and right surfaces of the end portion of the electrode lead 111. For example, the pressurizing bus bar 246 may have a bar shape elongated in an up-and-down direction and having at least a hexahedron. In addition, the pressurizing bus bar 246 may be positioned to face the lower plate portion 241B of the module bus bar 241.

In other words, the pressurizing bus bar 246 and the lower plate portion 241B of the module bus bar 241 may be respectively positioned on both sides of the end portion of the electrode lead 111 in the left-and-right direction. In other words, the end portion of the electrode lead 111 may be disposed between the pressurizing bus bar 246 and the lower plate portion 241B.

In a structure where the end portion of the electrode lead 111 contacts the module bus bar 241 while protruding in the front-and-back direction, it is required to form the width of the lower plate portion 241B in the left-and-right direction to be narrow. Accordingly, the lower plate portion 241B having the narrow width may become a bottleneck in which a current path of the module bus bar 241 electrically connected to the module terminal 250 becomes narrow, thereby increasing electric resistance of a bus bar, causing heat generation.

As such, according to such a configuration of the present disclosure, since the connection extending portion 241C increases an area of the current path of the module bus bar 241, heat generation caused by high electric resistance due to a structure of the lower plate portion 241B having a narrow current path may be prevented, and thus damage to internal components of the battery module 200 or an outbreak of fire during operation of the battery module 200 may be prevented.

Figure 7:
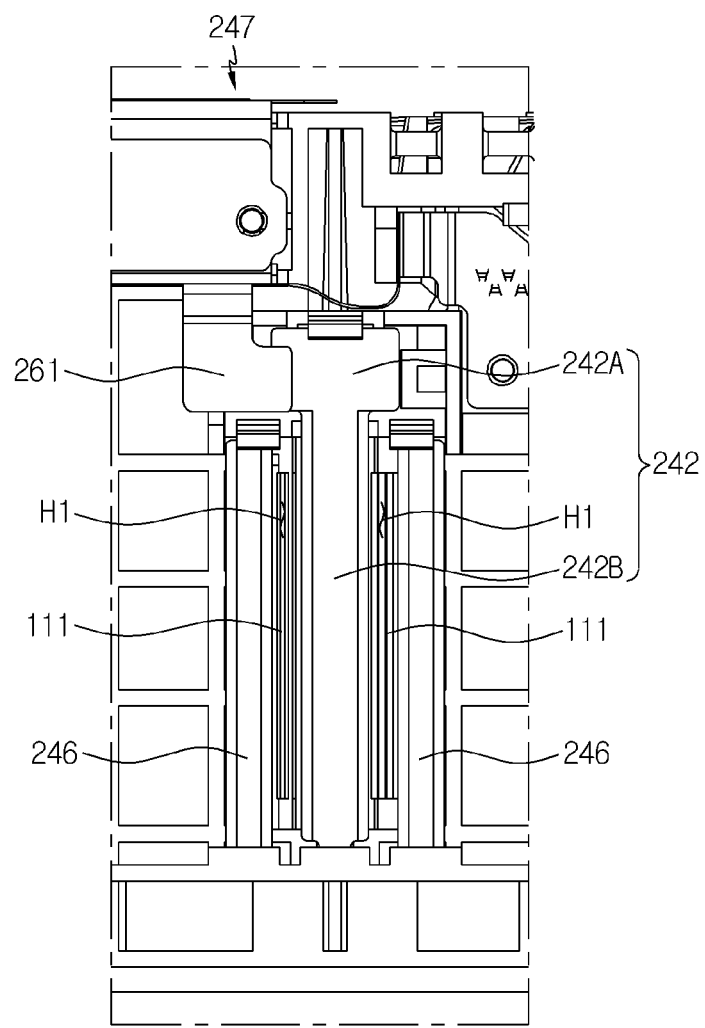
FIG. 7 is a partial front view schematically showing another region of some components of the battery module of FIG. 3.

FIG. 7 is a partial front view schematically showing another region of some components of the battery module of FIG. 3.

Referring to FIG. 7 together with FIG. 3, the bus bar assembly 240 may include at least one connection bus bar 242. In detail, the connection bus bar 242 may include an upper plate portion 242A and a lower plate portion 242B. Also, the upper plate portion 242A may be located relatively at a top portion of the lower plate portion 242B. Moreover, the upper plate portion 242A may be configured to contact a sensing lead 261 including a conductive material to perform voltage sensing of the secondary battery 110 electrically connected to the connection bus bar 242. The lower plate portion 242B may contact and be connected to the at least one electrode lead 111. In addition, the connection bus bar 242 may include a conductive metal material.

For example, as shown in FIG. 3, the bus bar assembly 240 may include three connection bus bars 242. Also, for example, as shown in FIG. 7, end portions of the three electrode leads 111 may contact and be connected to both side surfaces of the connection bus bar 242, respectively, while overlapping each other. Moreover, the connection bus bar 242 and the end portions of the three electrode leads 111 may contact and be connected to each other while being welded via laser welding or the like.

Referring back to FIG. 4 together with FIG. 3, the bus bar assembly 240 may further include a bus bar frame 247 configured to mount the module bus bar 241, the pressurizing bus bar 246, and the connection bus bar 242. The bus bar frame 247 may include an electric insulating material. For example, the electric insulating material may be plastic.

The bus bar frame 247 may mount the module bus bar 241 on an outer surface thereof. In detail, the module bus bar 241 may be mounted on and fixed to the bus bar frame 247. Also, the module bus bar 241 may be located at both side portions of the bus bar frame 247 in the left-and-right direction on the outer surface. In addition, the module bus bar 241 located at the left and the module bus bar 241 located at the right on the outer surface of the bus bar frame 247 may have different electric polarities.

The bus bar frame 247 may include a penetrating hole H1 through which at least one electrode lead 111 penetrates and protrudes. In detail, end portions of the plurality of electrode leads 111 may be configured to penetrate through the penetrating hole H1 of the bus bar frame 247 while protruding from the secondary battery 110 in the front-and-back direction.

The penetrating hole H1 may be provided at a location of the module bus bar 241 facing a side portion of the lower plate portion 241B. In other words, the penetrating hole H1 may be formed adjacent to one side portion of the module bus bar 241 in the left-and-right direction. Accordingly, the penetrating hole H1 may be formed at a location and in a size enabling the end portion of the electrode lead 111 inserted and penetrated through the bus bar frame 247 to easily contact and be connected to the side portion of the lower plate portion 241B of the module bus bar 241.

Referring back to FIG. 7, the penetrating hole H1 may be formed adjacent to each of both side portions of the connection bus bar 242 in the left-and-right direction. Accordingly, the two penetrating holes H1 may be formed such that the end portion of the electrode lead 111 inserted and penetrated through the penetrating hole H1 easily contacts and is connected to each of the side portions of the lower plate portion 241B of the connection bus bar 242.

Referring back to FIG. 5, a depressed structure 241S recessed inward in a direction the electrode lead 111 contacts may be formed at the lower plate portion 241B of the module bus bar 241 to accommodate and contact the end portions of the plurality of electrode leads 111. In other words, the depressed structure 241S of the lower plate portion 241B may be a structure depressed such that the end portion of the electrode lead 111 is accommodated therein.

Also, a lead contacting structure 241E configured to increase a contact area with the electrode lead 111 may be formed at one region of the depressed structure 241S.

In detail, the lead contacting structure 241E may have a shape bending and protruding in an outward direction in which the electrode lead 111 protrudes. Accordingly, left and right surfaces of the end portion of the electrode lead 111 may be attached to protruding left and right surfaces of the protruding lead contacting structure 241E. For example, as shown in FIG. 4, the left surface of the lead contacting structure 241E of the module bus bar 241 may contact and be connected to the right surface of one of the three electrode leads 111.

As such, according to such a configuration of the present disclosure, the lead contacting structure 241E has the shape bending and protruding in the outward direction, and thus may have a wide contact area with the left and right surfaces of the electrode lead 111 protruding in the front-and-back direction. Accordingly, high resistance may be prevented from occurring at a contact connecting region between the electrode lead 111 and the module bus bar 241, thereby increasing the left and stability of the battery module 200.

In addition, the pressurizing bus bar 246 may pressurize the end portion of the electrode lead 111 by using a tool, such as a welding jig or the like, only when a welding operation of the lower plate portion 241B and the electrode lead 111 is performed. In other words, the pressurizing bus bar 246 may be pressurized in a direction where the lower plate portion 241B of the module bus bar 241 is located such that the end portion of the electrode lead 111 closely contacts the lead contacting structure 241E of the lower plate portion 241B.

As such, according to such a configuration of the present disclosure, since laser welding is performed while the end portion of the electrode lead 111 is adhered to the surface of the module bus bar 241 by the pressurizing bus bar 246, a bonding process of high reliability may be performed.

In other words, the end portion of the electrode lead 111 may contact and be connected to the pressurizing bus bar 246 and/or the side portion of the module bus bar 241 while being welded via laser welding or the like.

Figure 8:
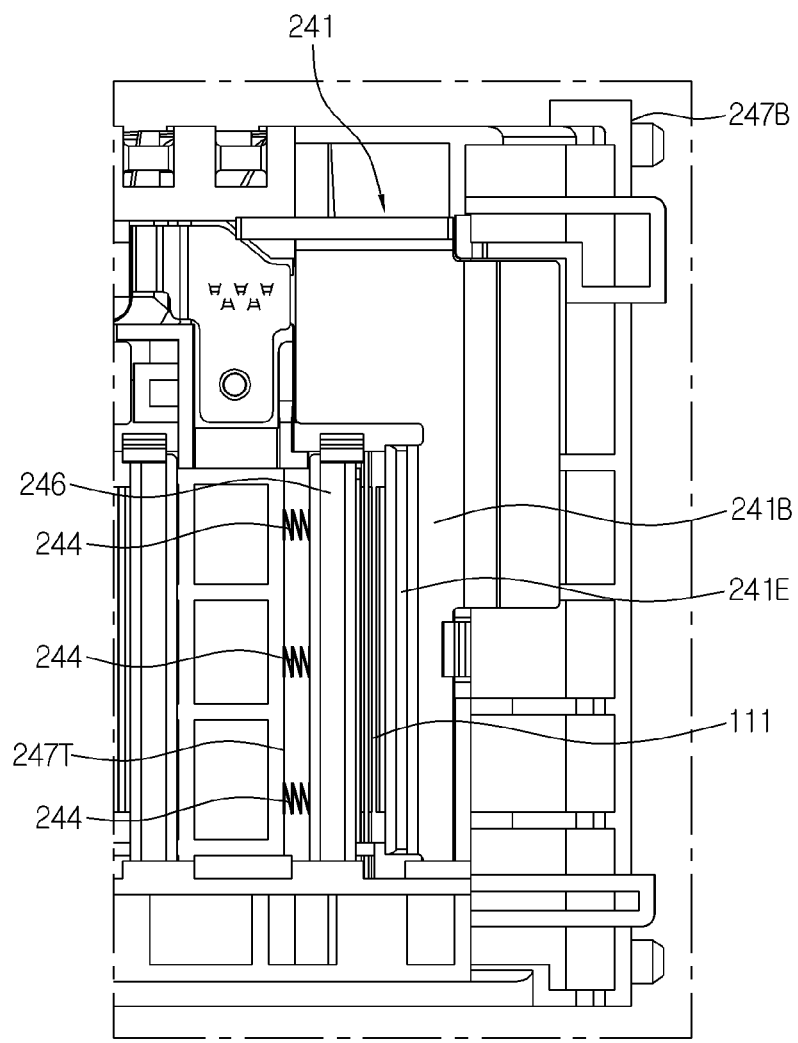
FIG. 8 is a partial front view schematically showing one region of some components of a battery module according to another embodiment of the present disclosure.

FIG. 8 is a partial front view schematically showing one region of some components of a battery module according to another embodiment of the present disclosure.

Referring to FIG. 8 together with FIG. 5, a bus bar frame 247B may further include a spring 244 configured to pressurize the pressurizing bus bar 246 in a direction where the end portion of the electrode lead 111 is located. In other words, the pressurizing bus bar 246 may be pressurized in a direction where the lower plate portion 241B of the module bus bar 241 is located by using elasticity of the spring 244. In this regard, the spring 244 may be mounted on a partition wall 247T protruding to the outside of the bus bar frame 247B.

For example, the partition wall 247T capable of supporting one side of the spring 244 may be formed on an outer surface of the bus bar frame 247B where the pressurizing bus bar 246 is accommodated. Also, the spring 244 may have one side connected to the partition wall 247T and the other side pressurizing one side surface of the pressurizing bus bar 246. In addition, the spring 244 may pressurize the pressurizing bus bar 246 to the electrode lead 111 in a direction where the lead contacting structure 241E of the lower plate portion 241B is located.

Figure 9:
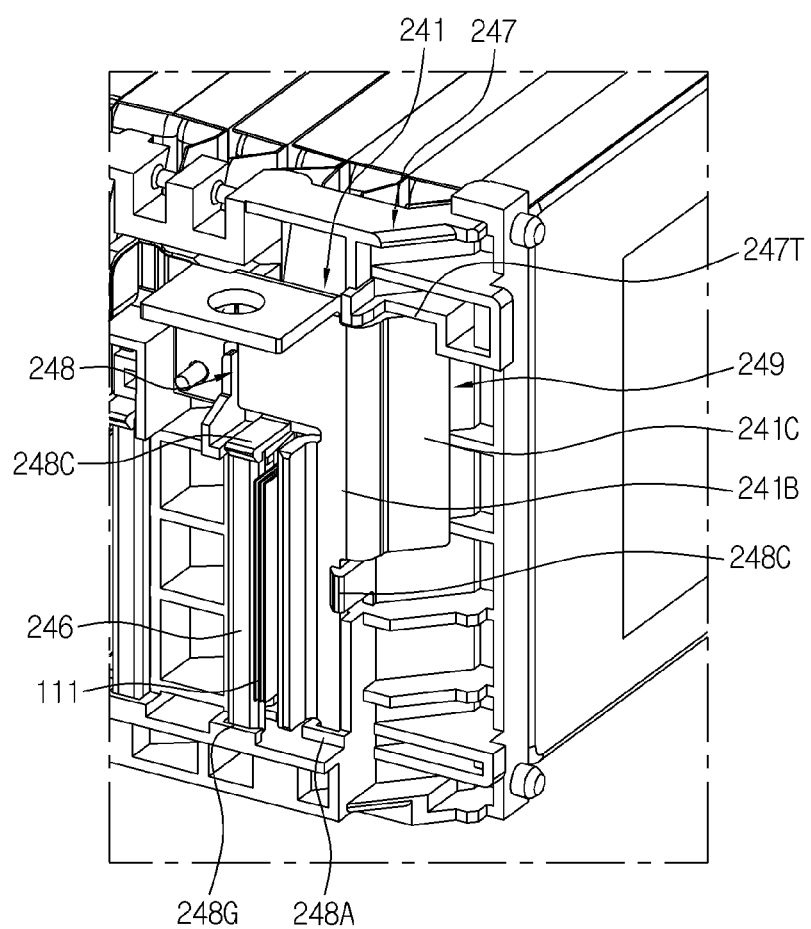
FIG. 9 is a partial perspective view schematically showing one region of some components of a battery module according to another embodiment of the present disclosure.

FIG. 9 is a partial perspective view schematically showing one region of some components of a battery module according to another embodiment of the present disclosure.

Referring to FIG. 9, a plurality of the partition walls 247T protruding in an outward direction may be formed on the outer surface of the bus bar frame 247. In detail, the partition wall 247T may be formed to protrude forward when the bus bar frame 247 is formed in front of the battery module 200. Also, the partition wall 247T may be formed to protrude backward when the bus bar frame 247 is formed at the back of the battery module 200.

Referring back to FIG. 9, the bus bar frame 247 may include a bus bar accommodating portion 248 having an outer surface depressed in an inward direction to accommodate the module bus bar 241 therein. The bus bar accommodating portion 248 may be depressed in the inward direction by a portion corresponding to at least one region of an outer shape of the module bus bar 241.

Also, the bus bar accommodating portion 248 may include a hook structure 248C protruding in an outward direction to fix the lower plate portion 241B or the pressurizing bus bar 246. In detail, the hook structure 248C may be a structure pressurizing an outer side portion of the pressurizing bus bar 246 or the lower plate portion 241B in an inward direction.

For example, as shown in FIG. 9, the hook structure 248C may be a structure pressurizing one side end portion of the lower plate portion 241B in the inward direction. Also, according to another embodiment, the hook structure 248C may be a structure pressurizing a top portion of the pressurizing bus bar 246.

As such, according to such a configuration of the present disclosure, the module bus bar 241 and the pressurizing bus bar 246 are stably fixed to the outer side of the bus bar frame 247 by the hook structure 248C, thereby increasing efficiency of a welding process between the electrode lead 111 and the module bus bar 241 and increasing durability of a finished product.

The bus bar accommodating portion 248 may include a detachment preventing structure 248A protruding in an upward direction to prevent a bottom portion of the lower plate portion 241B from being detached in an outward direction. In detail, the detachment preventing structure 248A may be formed at a location corresponding to at least one region of the bottom portion of the lower plate portion 241B.

As such, according to such a configuration of the present disclosure, since the detachment preventing structure 248A is configured to prevent the module bus bar 241 from being detached to the outside, not only the module bus bar 241 is stably fixed to the bus bar frame 247, but also frequent movement of the module bus bar 241 is prevented, and thus damage to a connection structure between the electrode lead 111 and the module bus bar 241 may be effectively prevented.

Also, a guide structure 248G configured to guide movement of a pressurizing direction of the pressurizing bus bar 246 may be provided. In detail, the guide structure 248G may have a guide wall extending in a pressurizing direction of the pressurizing bus bar 246 pressurizing the electrode lead 111.

For example, as shown in FIG. 9, the module bus bar 241 is accommodated in the bus bar accommodating portion 248 recessed in an inward direction of the bus bar frame 247. Also, the bus bar accommodating portion 248 includes the detachment preventing structure 248A preventing detachment of the bottom of the lower plate portion 241B and in addition, the guide structure 248G configured to guide the movement of the pressurizing bus bar 246 in the pressurizing direction.

Moreover, the connection extending portion 241C may be obliquely extended from the upper plate portion 241A and the lower plate portion 241B in an inward direction.

In other words, the connection extending portion 241C may be obliquely bent along the outer surface of the bus bar frame 247. Also, the bus bar frame 247 may include an auxiliary accommodating portion 249 obliquely depressed in an inward direction to accommodate the connection extending portion 241C.

For example, as shown in FIG. 9, the connection extending portion 241C of the module bus bar 241 may extend in a right direction and obliquely bend in the inward direction along the outer surface of the bus bar frame 247.

The connection extending portion 241C may have a structure curved in an inward direction at one region of a plate shape. Also, the bus bar frame 247 may include the auxiliary accommodating portion 249 obliquely depressed in the inward direction to accommodate the connection extending portion 241C therein.

As such, according to such a configuration of the present disclosure, since the connection extending portion 241C obliquely bends in the inward direction, a contact or interference between the connection extending portion 241C of the module bus bar 241 and an external object may be prevented and the module bus bar 241 may be further compactly manufactured.

Referring back to FIGS. 1 and 2, the end plate 220 may be combined to the outer side of the bus bar assembly 240 located at each of the front of and the back of the battery module 200.

Also, a plurality of the side plates 210 may be provided to surround each of both side surfaces of the cell assembly 100 in the left-and-right direction.

The battery module 200 may further include an upper cover 230A and a lower cover 230B to cover the top and bottom thereof.

Figure 10:
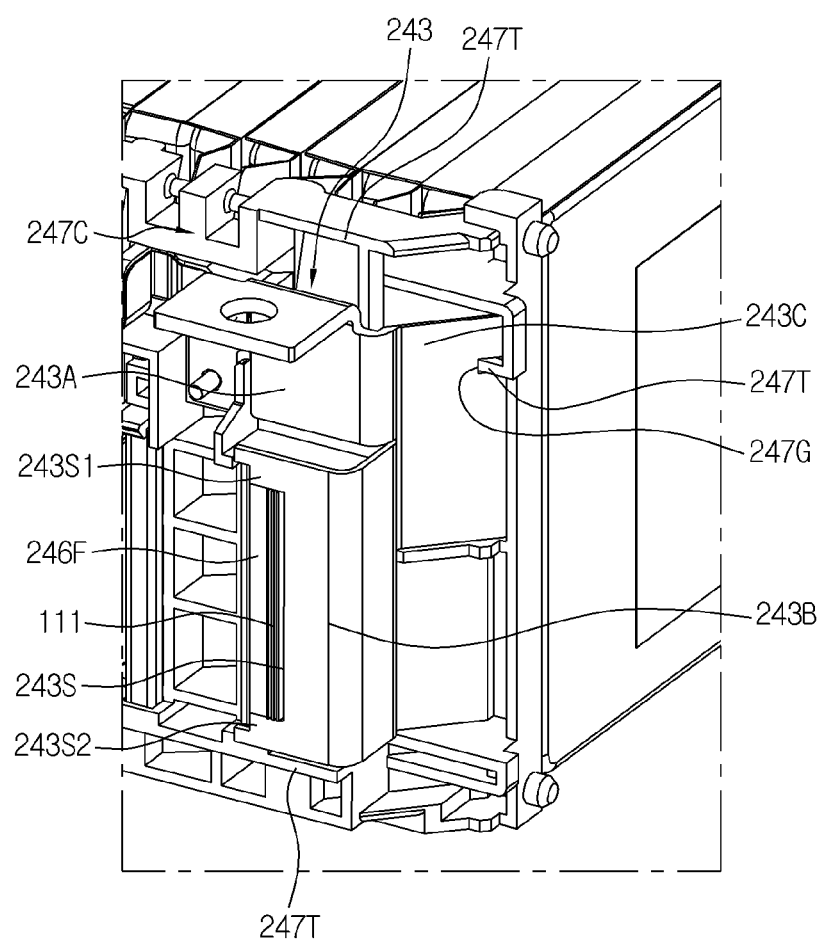
FIG. 10 is a partial perspective view schematically showing one region of some components of a battery module according to another embodiment of the present disclosure.

FIG. 10 is a partial perspective view schematically showing one region of some components of a battery module according to another embodiment of the present disclosure.

Referring to FIG. 10, the partition wall 247T formed at a bus bar frame 247C may protrude to surround an outer surface of a module bus bar 243 to protect the module bus bar 243 mounted on the bus bar frame 247C from the outside.

In addition, the partition wall 247T may include a fitting groove 247G recessed inward such that a part of the module bus bar 243 is inserted. In detail, an end portion of a connection extending portion 243C of the module bus bar 243 may be inserted into the fitting groove 247G.

As such, according to such a configuration of the present disclosure, in the module bus bar 243, since not only the connection extending portion 243C is inserted and firmly fixed to the fitting groove 247G, but also the fitting groove 247G guides the module bus bar 243 to be fixed at an accurate location, manufacturing time may be reduced.

Also, a part of a pressurizing bus bar 246F may be bonded to an end portion of the electrode lead 111. In detail, the pressurizing bus bar 246F may have a bar shape extending in the up-and-down direction. Also, one side surface of the pressurizing bus bar 246F may be bonded to the end portion of the electrode lead 111.

In addition, one region of the pressurizing bus bar 246F may be bonded to the module bus bar 243. Also, a top portion and a bottom portion of the pressurizing bus bar 246F may be bonded to one region of a lower plate portion 243B of the module bus bar 243.

For example, as shown in FIG. 10, one side surface of the end portion of the electrode lead 111 may be bonded to a depressed structure 243S formed at the lower plate portion 243B, and the other side surface of the end portion of the electrode lead 111 may be bonded to one side surface of the pressurizing bus bar 246F. Also, both end portions of the pressurizing bus bar 246F in the up-and-down direction may be respectively bonded to a top portion 243S1 and a bottom portion 243S2 of the depressed structure 243S of the lower plate portion 243B.

As such, according to such a configuration of the present disclosure, since the end portion of the electrode lead 111 is disposed between the module bus bar 243 and the pressurizing bus bar 246F to be bonded to both the module bus bar 243 and the pressurizing bus bar 246F, and both end portions of the pressurizing bus bar 246F are bonded to the top and bottom portions of the depressed structure 243S of the lower plate portion 243B, a bonding area between the module bus bar 243 and the pressurizing bus bar 246F is effectively increased, thereby effectively reducing high resistance that may occur in a connection structure between the electrode lead 111 and the module bus bar 243 and increasing reliability of electric connection.

Meanwhile, a battery pack according to the present disclosure may include at least one battery module 200 according to the present disclosure. Also, the battery pack according to the present disclosure may further include, in addition to the battery module 200, a pack case for accommodating the battery module 200 and various devices for controlling charging and discharging of the battery module 200, such as a battery management system (BMS), a current sensor, a fuse, etc.

Also, the battery pack according to the present disclosure may be applied to a vehicle, such as an electric vehicle. In other words, the vehicle according to the present disclosure may include the battery pack according to the present disclosure.

Meanwhile, in the present specification, the terms indicating directions, such as up, down, left, right, front, and back, are used but it would be obvious to one of ordinary skill in the art that the terms are used only for convenience of description and may vary according to a position of a target object, a position of an observer, or the like.

While the present disclosure has been particularly shown and described with reference to exemplary embodiments thereof, it will be understood by those of ordinary skill in the art that various changes in form and details may be made therein without departing from the scope of the present disclosure as defined by the following claims.

[List of Reference Numerals]

| | |
|---|---|
| 200: Battery Module | 100: Cell Assembly |
| 110: Secondary Battery | 115: Accommodating Portion |
| 111: Electrode Lead | 250: Module Terminal |
| 240: Bus Bar Assembly | 242: Connection Bus Bar |
| 241: Module Bus Bar | 241A: Upper Plate Portion |
| 241B: Lower Plate Portion | 241C: Connection Extending Portion |
| 241D: Bent Connecting Portion | 246: Pressurizing Bus Bar |
| 241S: Depressed Structure | 241E: Lead Contacting Structure |
| 247: Bus Bar Frame | H1: Penetrating Hole |
| 244: Spring | 247T: Partition Wall |
| 247G: Fitting Groove | 248: Bus Bar Accommodating Portion |
| 248C: Hook Structure | 248A: Detachment Preventing Structure |
| 248G: Guide Structure | 249: Auxiliary Accommodating Portion |
| 220: End Plate | 210: Side Plate |

INDUSTRIAL APPLICABILITY

The present disclosure relates to a battery module and a battery pack including the same. Also, the present disclosure is applicable to industries related to electronic devices or vehicles including the battery module.

What is claimed is:

1. A battery module comprising:
   a cell assembly comprising a plurality of secondary batteries that each comprise a plurality of electrode leads and are stacked in at least one direction;
   a module terminal comprising a connection terminal configured to provide electric connection with an external device; and
   a bus bar assembly comprising:
      a module bus bar comprising an upper plate portion and a lower plate portion that electrically connect the plurality of secondary batteries and the module terminal and each have at least one region separated from each other, a connection extending portion that extends to one side end portion of each of the upper plate portion and the lower plate portion to electrically connect the upper plate portion and the lower plate portion to each other, and a bent connecting portion that protrudes from a top of the upper plate portion by being bent in an outward direction and has one region combined to the module terminal; and
      a pressurizing bus bar pressurizing the plurality of electrode leads such that end portions of the plurality of electrode leads contact the lower plate portion.

2. The battery module of claim 1, wherein the bus bar assembly further comprises a bus bar frame having an outer surface where the module bus bar is mounted and having a penetrating hole through which at least one of the plurality of electrode leads penetrates and protrudes.

3. The battery module of claim 2, wherein end portions of at least some of the plurality of electrode leads protrude from the plurality of secondary batteries to penetrate through the penetrating hole of the bus bar frame, and
   the lower plate portion has a depressed structure recessed inward in a direction in which the plurality of electrode leads are contacted such as to accommodate and contact the end portions of the at least some of the plurality of electrode leads.

4. The battery module of claim 3, wherein a lead contacting structure bending and protruding in an outward direction and contacting the at least some of the plurality of electrode leads is formed at one region of the depressed structure.

5. The battery module of claim 3, wherein the bus bar frame further comprises a spring configured to pressurize the pressurizing bus bar in a direction where the end portions of the at least some of the plurality of electrode leads are located.

6. The battery module of claim 2, wherein a plurality of partition walls protruding in an outward direction are formed on the outer surface of the bus bar frame, and
a fitting groove recessed inward such that an end portion of the connection extending portion is inserted thereinto is formed at the partition wall.

7. The battery module of claim 6, wherein the bus bar frame comprises a bus bar accommodating portion having an outer surface depressed in an inward direction to accommodate the module bus bar therein, and
the bus bar accommodating portion comprises:
a hook structure protruding in an outward direction to fix the lower plate portion or the pressurizing bus bar;
a detachment preventing structure protruding in an upward direction to prevent a bottom portion of the lower plate portion from being detached in an outward direction; and
a guide structure configured to guide movement of the pressurizing bus bar in a pressurizing direction.

8. The battery module of claim 6, wherein the connection extending portion extends obliquely in an inward direction from the upper plate portion and the lower plate portion, and
the bus bar frame comprises an auxiliary accommodating portion depressed in an inward direction to accommodate the connection extending portion.

9. A battery module comprising:
a cell assembly comprising a plurality of secondary batteries that each comprise a plurality of electrode leads and are stacked in at least one direction;
a module terminal comprising a connection terminal configured to provide electric connection with an external device;
a bus bar assembly comprising:
a module bus bar comprising an upper plate portion and a lower plate portion that electrically connect the plurality of secondary batteries and the module terminal and each have at least one region separated from each other, a connection extending portion that electrically connects the upper plate portion and the lower plate portion to each other by being combined to at least one region of each of the upper plate portion and the lower plate portion, and a bent connecting portion that protrudes from a top of the upper plate portion by being bent in an outward direction and has one region combined to the module terminal;
a pressurizing bus bar pressurizing the plurality of electrode leads such that end portions of the plurality of electrode leads contact the lower plate portion; and
a bus bar frame having an outer surface where the module bus bar is mounted and having a penetrating hole through which at least one of the plurality of electrode leads penetrates and protrudes;
an end plate combined to an outer surface of the bus bar assembly; and
a plurality of side plates configured to surround side surfaces of the cell assembly.

10. A battery pack comprising at least one battery module according to claim 1.

11. A vehicle comprising the battery pack according to claim 10.

12. The battery module of claim 9, wherein end portions of at least some of the plurality of electrode leads protrude from the plurality of secondary batteries to penetrate through the penetrating hole of the bus bar frame, and
the lower plate portion has a depressed structure recessed inward in a direction in which the plurality of electrode leads are contacted such as to accommodate and contact the end portions of the at least some of the plurality of electrode leads.

13. The battery module of claim 12, wherein a lead contacting structure bending and protruding in an outward direction and contacting the at least some of the plurality of electrode leads is formed at one region of the depressed structure.

14. The battery module of claim 12, wherein the bus bar frame further comprises a spring configured to pressurize the pressurizing bus bar in a direction where the end portions of the at least some of the plurality of electrode leads are located.

15. The battery module of claim 9, wherein a plurality of partition walls protruding in an outward direction are formed on the outer surface of the bus bar frame, and
a fitting groove recessed inward such that an end portion of the connection extending portion is inserted thereinto is formed at the partition wall.

16. The battery module of claim 15 wherein the bus bar frame comprises a bus bar accommodating portion having an outer surface depressed in an inward direction to accommodate the module bus bar therein, and
the bus bar accommodating portion comprises:
a hook structure protruding in an outward direction to fix the lower plate portion or the pressurizing bus bar;
a detachment preventing structure protruding in an upward direction to prevent a bottom portion of the lower plate portion from being detached in an outward direction; and
a guide structure configured to guide movement of the pressurizing bus bar in a pressurizing direction.

17. The battery module of claim 15, wherein the connection extending portion extends obliquely in an inward direction from the upper plate portion and the lower plate portion, and
the bus bar frame comprises an auxiliary accommodating portion depressed in an inward direction to accommodate the connection extending portion.

18. A battery pack comprising at least one battery module according to claim 9.

19. A vehicle comprising the battery pack according to claim 18.

* * * * *